Patented Dec. 21, 1948

2,456,641

UNITED STATES PATENT OFFICE 2,456,641

SUGAR CANE WAX REFINING

Elbert S. McLoud, Racine, Wis., assignor to S. C. Johnson & Son, Inc., Racine, Wis.

No Drawing. Application July 12, 1946, Serial No. 683,141

5 Claims. (Cl. 260—428.5)

This invention relates to the refining of sugar cane wax, and more particularly relates to a process for removing the resinous fraction from sugar cane wax.

Various methods are known for separating crude sugar cane wax from clarification muds, or other sugar cane factory waste products by the use of organic solvents, such as toluene. Several investigators have separated crude sugar cane wax into a soluble fraction and a hard fraction; one recent method is described in U. S. Patent No. 2,381,420 to Balch. By this method, chipped or broken crude wax pieces are placed in a container and covered with a fat solvent, such as acetone, and the fatty portions are separated from the crude wax by a process of diffusing into the solvent. Another method has been recently described in U. S. Patent No. 2,391,893 to Goepfert. According to this method sugar cane wax is separated from "mud" by the use of certain lower alkyl propionates.

Now, in accordance with my invention, I have developed a process for removing the resinous fraction from the hard wax fraction. The so-called resinous fraction is a black pitch-like material with no definite melting point, but which softens at temperatures varying from about 100° to 160° C. This method is equally applicable in removing the resinous fraction from sugar cane wax irrespective of what method was used in obtaining the hard fraction from the crude sugar cane wax.

My method comprises contacting sugar cane wax from which the soft fraction has been removed with a lower alcohol having not more than 3 carbon atoms, heating said mixture sufficiently to put the wax fraction into solution while keeping the alcohol in liquid phase, and separating the resinous fraction from the wax fraction.

Now, having indicated in a general way, the nature and purpose of this invention, the following examples will illustrate the invention. It is to be understood, however, that such examples are presented merely as illustrations of the invention, and are not to be construed as limiting the same. In the examples, the ingredients are given in parts by weight, unless otherwise indicated.

Example 1

Two hundred parts of commercially available sugar cane wax was treated with 1,000 parts of iso-propyl alcohol. The mixture was heated to about 80° to 82° C. until the wax fraction went into solution. Two immiscible phases formed, the lighter layer contained the wax fraction, and the heavy layer contained the resinous fraction. The two immiscible phases were separated by decantation. The light layer was then evaporated, the final traces of iso-propyl alcohol being removed in a batch vacuum evaporator. The residue left after evaporation was a brittle, brown waxy fraction having a melting point of about 75° C. Recovery was about 70 per cent. The heavy layer was removed to a chamber where the iso-propyl alcohol was distilled off. The solids recovered constituted a black pitch-like resinous fraction having no definite melting point but which softened at temperatures varying from about 100° to 160° C. This fraction constituted about 30 per cent.

Example 2

Ten parts of commercially available sugar cane wax was treated with 40 parts of methyl alcohol. The mixture was heated to about 95° C., under sufficient pressure to keep the methyl alcohol in liquid phase. This heating was continued until the wax fraction went into solution. Two immiscible phases formed and the wax fraction and resinous fraction were separated and recovered by the method of Example 1.

Example 3

Example 2 was repeated except that ethyl alcohol was substituted for the methyl alcohol. It was the equivalent of methyl alcohol for use in this process.

From the foregoing examples a method has been illustrated by which the resinous fraction can be removed from sugar cane wax.

While methyl, ethyl and iso-propyl alcohols have been illustrated in the examples, the invention is not so limited. Although iso-propyl alcohol is preferred, all lower alcohols having not more than 3 carbon atoms are operable in this invention. These alcohols are methyl, ethyl, n-propyl and iso-propyl.

The amount of lower alcohol used in forming the mixture of hard fraction is about 4 pounds upward of lower alcohol per pound of solids. In practice a ratio of about 4 to about 8 pounds of lower alcohol per pound of solids is preferred.

The mixture of lower alcohol and hard fraction is heated to a temperature sufficient to place the wax fraction in solution. Since it is necessary to maintain the lower alcohol in liquid phase, in the event that the lower alcohol used has a boiling point of less than 75° C., e. g. methol alcohol, it will be necessary to carry out the heating under pressure. Likewise, if it is desired to heat the mixture to a temperature above the boiling point of the lower alcohol, the heating must be carried out under pressure. While the minimum temperature at which the mixture is heated should be about 75° C., the upper temperature limit will depend upon the ability of the wax to withstand the temperature. Operation at a higher temperature than is necessary to insure that the wax is in solution, has the disadvantage of increasing the amount of heat required, as well as increasing the pressure necessary to maintain the lower alcohol in liquid phase. For the practical reason of easy operation, a temperature of from about 75° to 125° C. is recommended, although a temperature of about 80° to 95° has been used in carrying out the examples.

Upon heating, the mixture gives almost instantaneously two immiscible phases which can be separated, for example, by decantation, either by batch or a continuous method. In practice, it has been found convenient to separate the light layer containing the waxy fraction continuously. This light layer may be distilled in conventional evaporating equipment to remove the lower alcohol. The residue left after removal of the lower alcohol is the waxy fraction having a melting point of about 75° C.

The heavy layer or resinous fraction is preferably withdrawn periodically into a receiver from which the lower alcohol may be distilled. The residue left after removal of the lower alcohol is a resinous fraction which has no definite melting point but which softens at a temperature from 100° to 160° C.

Other methods of recovering the waxy fraction and the resinous fraction may be used, if desired.

From the foregoing it will be seen that a practical method has been developed for refining sugar cane wax to remove the resinous material. The resulting refined sugar cane wax has improved properties for bleaching, decolorizing, emulsification, etc. The method developed lends itself to continuous separation, or batch, as desired.

I claim:

1. A process for removing the resinous fraction from sugar cane wax comprising contacting sugar cane wax from which the soft fraction has been removed with at least four times by weight of a lower alcohol having not more than 3 carbon atoms, heating said mixture sufficiently to put the wax fraction into solution while keeping the alcohol in liquid phase, and separating the resinous fraction from the wax fraction.

2. A process for removing the resinous fraction from sugar cane wax comprising contacting sugar cane wax from which the soft fraction has been removed with at least four times by weight of methyl alcohol, heating said mixture sufficiently to put the wax fraction into solution while keeping the methyl alcohol in liquid phase, and separating the resinous fraction from the wax fraction.

3. A process for removing the resinous fraction from sugar cane wax comprising contacting sugar cane wax from which the soft fraction has been removed with at least four times by weight of ethyl alcohol, heating said mixture sufficiently to put the wax fraction into solution while keeping the ethyl alcohol in liquid phase, and separating the resinous fraction from the wax fraction.

4. A process for removing the resinous fraction from sugar cane wax comprising contacting sugar cane wax from which the soft fraction has been removed with at least four times by weight of propyl alcohol, heating said mixture sufficiently to put the wax fraction into solution while keeping the propyl alcohol in liquid phase, and separating the resinous fraction from the wax fraction.

5. A process for removing the resinous fraction from sugar cane wax comprising contacting sugar cane wax from which the soft fraction has been removed with at least four times by weight of iso-propyl alcohol, heating said mixture sufficiently to put the wax fraction into solution while keeping the iso-propyl alcohol in liquid phase, and separating the resinous fraction from the wax fraction.

ELBERT S. McCLOUD.

REFERENCES CITED

The following references are of record in the file of this patent:

UNITED STATES PATENTS

| Number | Name | Date |
|---|---|---|
| 2,009,522 | Rosales | July 30, 1935 |